July 23, 1946. T. JENSEN 2,404,380
VERTICAL MIXER
Filed Feb. 19, 1944 3 Sheets-Sheet 1

INVENTOR
THORMOD JENSEN
BY George S Hartman
ATTORNEY

INVENTOR
THORMOD JENSEN
BY George S Hastings
ATTORNEY

July 23, 1946.   T. JENSEN   2,404,380
VERTICAL MIXER
Filed Feb. 19, 1944   3 Sheets-Sheet 3

A — HIGH PRECESSION RATIO
BEATER ROTATES 3.73
REVOLUTIONS TO 1
REVOLUTION OF
BEATER HEAD

B — NEUTRAL
NO ROTATION OF
BEATER HEAD,
BEATER CONTINUES
TO ROTATE

C — LOW PRECESSION RATIO
BEATER ROTATES 2
REVOLUTIONS TO 1
REVOLUTION OF
BEATER HEAD

INVENTOR
THORMOD JENSEN
BY Georges Hastings
ATTORNEY

Patented July 23, 1946

2,404,380

UNITED STATES PATENT OFFICE 2,404,380

VERTICAL MIXER

Thormod Jensen, Laurelton, N. Y., assignor to American Machine & Foundry Company, a corporation of New Jersey Application February 19, 1944, Serial No. 523,031

23 Claims. (Cl. 74—300)

This invention relates to the art of mixing materials such as dough, more particularly to a novel mixer construction. Certain types of vertical mixers have an upright beater disposed in the mixing bowl and supported from a revolving head, the beater having an epicyclic motion about the shaft from which the head is supported. Thus the beater is moved in an orbital path within the bowl. In one standard vertical mixer of this type the precession ratio, that is the ratio of the rotation of the revolving head through one revolution and the rotation of the beater on its own axis, is 1/3.73. In other words, the beater makes 3.73 revolutions upon its own axis while making a complete circuit of its orbit in the bowl. Other standard types of vertical mixers have precession ratios which vary for different machines from 1/4.07 to 1/3.5. The enumerated precession ratios, while satisfactory for mixing dough, are disadvantageous when mixing "foam" batches such as marshmallow and sponge cake, because I have discovered that a lower precession ratio is needed to reduce the swirling of the "foam" batch resulting from the enumerated precession ratios. This swirling of the "foam" lengthens the time required for mixing it and may even impair the quality of the mixed product, and will be avoided by suitably reducing the precession ratio. While there has been described above a specific example wherein the invention may be applied, it will be understood that one of the main objects of the invention is to provide a flexible construction wherein adjustments may be made to compensate for varying conditions in the material being mixed.

Another object of the invention is to provide a vertical mixer construction wherein the precession ratio may be varied. Still another object is to permit the precession ratio to be varied during the initial and final stages of the mixing operation.

In the accompanying drawings which form a part of this specification:

Figure 1:
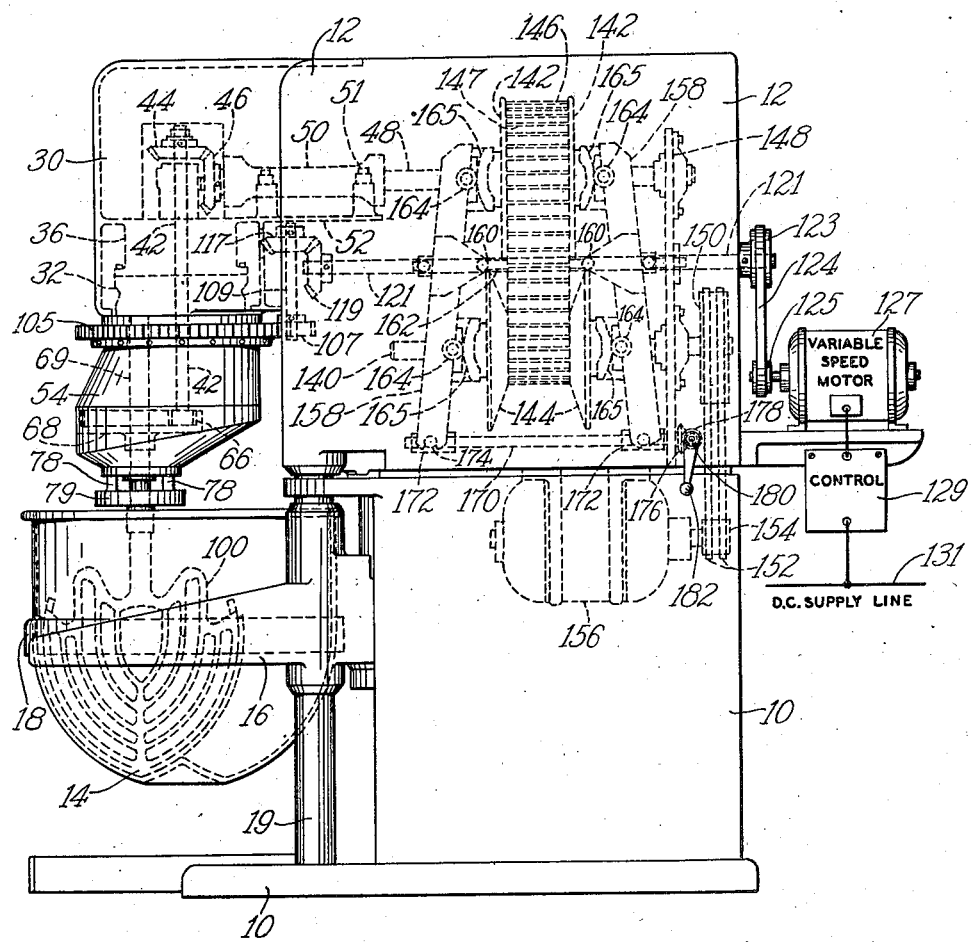
Fig. 1 is an elevation of a vertical mixer embodying my invention.
Figure 2:
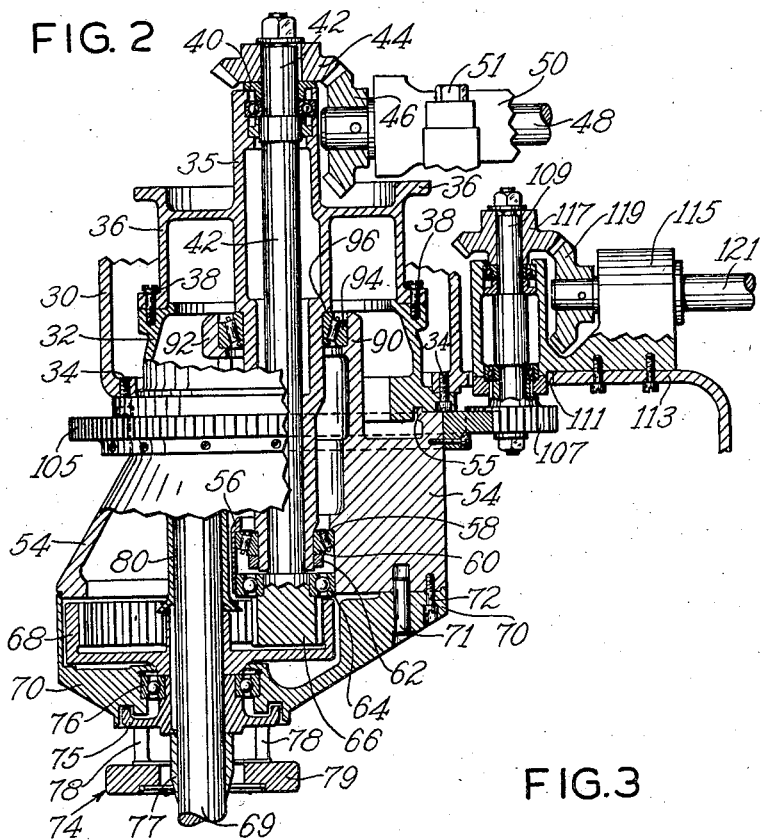
Fig. 2 is a sectional view of the beater head and a portion of the mechanism for driving the same and the beater spindle.

Referring to the drawings, the mixer is provided with a base 10 supporting a movable head 12 having downwardly extending columns (not shown) slidably mounted in base 10. In Fig. 1 the bowl 14 and the beater head 54 are shown in the mixing position wherein the head 12 rests on the top of base 10 and saddle 16 engages the bottom of the circumferential band 18 on the bowl and thereby supports the latter in mixing position. After the mixing operation is completed, the head 12 is elevated and the saddle 16 is lowered by mechanism (not shown), similar to that disclosed in the Dehuff Patent 2,181,079, issued November 21, 1939, to permit removal of the bowl. It may be noted that the saddle is slidably mounted on upright columns 19 which guide its descending movement. Since the construction of the base 10, head 12, and saddle 16 is similar to that shown in the above mentioned Dehuff patent, further description thereof is deemed unnecessary.

Within a gear housing 30, which may be formed integrally with the head 12, is located a base 32. The latter has an external circumferential flange which is fastened by screws 34 to an internal flange on housing 30. A sleeve 35 is provided with an integral flange 36 which is fastened to the base 32 by screws 38. At the upper end of sleeve 35 is provided a bearing 40 wherein is mounted the upper end of a shaft 42. Upon the end of shaft 42 protruding from bearing 40 is secured a bevel gear 44 meshing with a bevel gear 46 fastened on a shaft 48 supported by bearing 50 and driven from a variable speed drive hereinafter described. Bearing 50 is fastened by studs 51 to an extension 52 (Fig. 1) of the housing 30.

The shaft 42 and sleeve 35 project downwardly through the base 32 into the hollow beater head 54. The latter is provided with an annular rib 55 fitting into a groove in the bottom of base 32 and also with an annular lug 56, admitting the lower ends of the sleeve 35 and shaft 42. The lug 56 is suitably bored to provide an internal shoulder 58 against which the roller bearings 60 mounted on sleeve 35 are held by a collar 62 fastened to the sleeve. The lower end of shaft 42, which projects from sleeve 35 and revolves in ball bearings 64 fitted into lug 56, is provided with a pinion 66 meshing with an internal ring gear 68 keyed to a beater spindle 69. Gear 68 is supported in a cover 70 fastened to head 54 by a pin 71 and a screw 72. The lower end of spindle 69 projects downwardly through cover 70 and has mounted thereon a beater drive clutch 74. The latter includes a sleeve 75 keyed on spindle 69 and revolving in ball bearings 76 and retained on the spindle 69 by a collar 77 which is pinned to the spindle. The sleeve 75 has downwardly depending arms 78 which have inwardly projecting lugs on which diametrically opposite lugs on the inserted shank of beater 100 rest. A ring 79, which is movable vertically on arms 78 has a series of inwardly projecting lugs which engage the lugs on the inserted beater shank and thereby drive the beater. Since the construction of the beater drive clutch is similar to that shown in the patent to W. F. Dehuff, No. 1,792,363, further description thereof is deemed unnecessary. The upper end of spindle 69 is revolubly mounted in a bearing (not shown) and has mounted thereon a sleeve 80 serving as an oil shield.

The beater head is provided with a tubular extension 90 projecting upwardly through the base 32 and provided with an annular flange 92, carrying roller bearings 94 on which a shoulder 96 of sleeve 35 is mounted.

Figure 3:
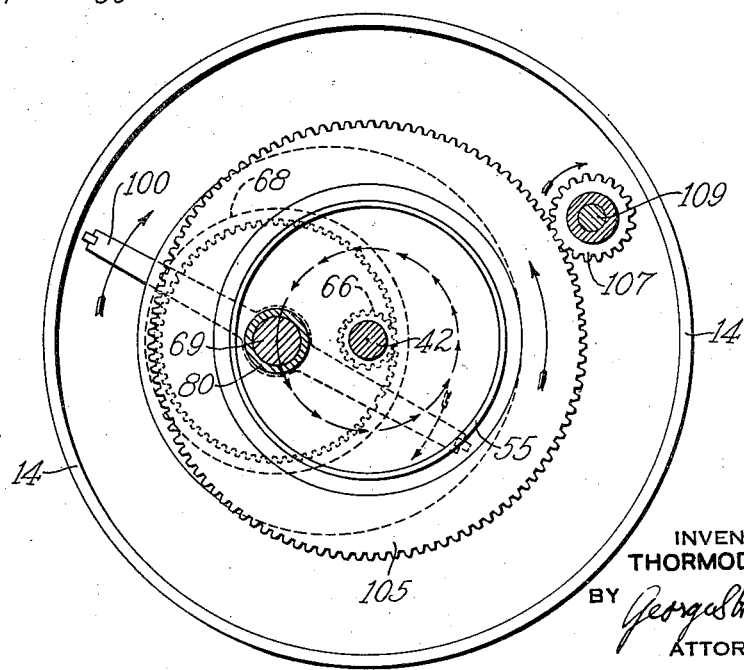
Fig. 3 is a schematic view illustrating the epicyclic motion of the beater spindle about the axis of the beater head and showing the direction of rotation of the beater in the mixing bowl.

The beater head may be driven as shown herein. For this purpose the beater head is equipped with an external ring gear 105 which is driven from a stationary pinion 107 mounted on the lower end of a shaft 109 projecting through an aperture 111 in the extension 113 of the housing 30. Extension 113 extends transversely of head 12 from one side wall to the other thereof and downwardly to the bottom thereof. The shaft 109 is revolubly supported in ball bearings of a pedestal 115 fastened to the top of extension 113. A bevel gear 117 secured on one end of shaft 109 is driven from a bevel gear 119 secured on shaft 121. Thus, when the pinion 107 is driven in the direction indicated by the arrow in Fig. 3, the beater spindle will be moved in an orbital path indicated by the arrow circle and the beater 100 will revolve in the direction of the arrow marked thereon with a predetermined precession ratio. To vary this precession ratio suitable mechanism, which will now be described, is provided.

On the end of shaft 121 protruding from head 12 is fastened a pulley 123 driven by a belt 124 from the pulley 125 on the shaft of the variable speed motor 127. This motor is supported on a bracket fastened to head 12 and may be of the shunt-wound direct current type, and be supplied with current through a control 129 from a D. C. supply line 131. By regulating control 129, which may be of the type known as the Ward Leonard System, or any suitable device, the speed of motor 127 may be regulated. Thus by regulating the speed of motor 127 the precession ratio of the beater 100 relative to the rotation of the beater head 54, that is the speed of rotation of the beater or beater spindle upon its own axis relative to the speed at which the beater spindle travels the orbital path indicated by arrow circle in Fig. 3, may be varied. Instead of using a Ward Leonard type of control, the control 129 may be a variable field rheostat in series with the motor field winding whereby the current through the field may be varied upon adjusting the rheostat, to adjust the speed of the motor and thereby vary the precession ratio in the range between ½ or ¼ or slightly greater.

If it is deemed desirable, the speed of rotation of the shaft 42 may also be varied by mechanism which will now be described and the precession ratio of the rotation of the beater head and beater spindle may be thus varied. The shaft 48, which drives shaft 42, constitutes the driven shaft of a variable speed drive commonly called a "Reeves drive," the shaft 140 constituting the driving shaft thereof. Shaft 48 carries a pair of complementary conical pulleys 142, and shaft 140 carries a pair of complementary conical pulleys 144, each pair of pulleys forming a wedge-shaped space in which is seated an endless belt 146, to which are fastened wooden strips 147 having beveled ends which engage the conical faces of the pulleys. Shafts 48 and 140 are mounted in a pedestal 148 supported in head 12. Shaft 140 carries a pulley 150 which is driven by an endless belt 152 from a pulley 154 on the shaft of a motor 156 suitably secured by bolts, or otherwise, to the bottom of the head 12. Bars 158 which are pivoted on pins 160 carried by a rod 162 supported in pedestal 148, are provided at either of their ends with rollers 164 engaging flanges 165 on the hubs of the pulleys 142 and 144. A rod 170 rotatably supported in the pedestal 148 has oppositely threaded ends upon which are threaded blocks 172 carrying pins 174 which engage notches in the lower ends of bars 158. A bevel gear 176 on one end of rod 170 meshes with a bevel gear 178 fastened on one end of a shaft 180 whose other end protrudes from the head 12. By turning a crank handle 182 secured on the protruding end of shaft 180 the bars 158 are moved upon their pivots to bring the pulleys 144 closer together whereby the belt 146 will separate pulleys 142, or vice versa. Thus the speed at which shaft 42 is driven may be varied. Since the construction of the variable speed drive is similar to that shown in the Dehuff Patents 1,890,500 and 2,181,079, further description thereof is deemed unnecessary.

Under some conditions it may be desirable to vary the precession ratio of the beater between the initial and the final stages of the mixing operation. To this end the control 129 may be regulated to vary the precession ratio of the beater at the desired stage of the mixing operation.

Figure 4:
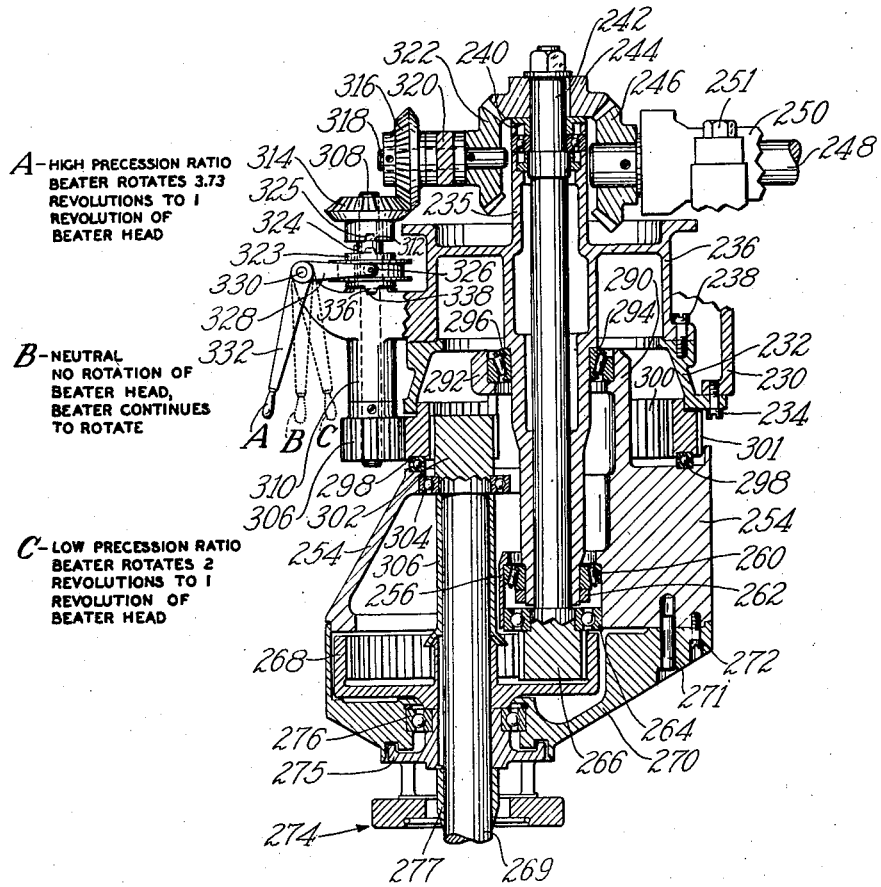
Fig. 4 is a sectional view similar to that of Fig. 2 of a modified form of the beater head and a portion of the mechanism for driving the beater spindle and the beater head.

Referring to Fig. 4, the modified form of beater head shown therein has a base 232 which may be provided with an external flange secured to an internal flange on housing 230 by screw 234. Housing 230 may be similar to gear housing 30 described above and may be similarly formed on a head (not shown) corresponding to the head 12. A sleeve 235 which is similar to sleeve 35, is provided with an external flange 236 which is secured by screw 238 to base 232. At the upper end of sleeve 235 is provided a bearing 240 wherein the upper end of a shaft 242 is supported. Upon the portion of shaft 242 protruding from bearing 240 is secured a bevel gear 244 meshing with a bevel gear 246 fastened on a shaft 248 supported in a bearing 250. The bearing 250 is similar to bearing 50 described above and is similarly fastened by studs 251 to an extension on housing 230. Shaft 248 may be suitably driven from a variable speed drive (not shown) similar to the mechanism described above for driving shaft 48.

The shaft 242 and sleeve 235 project downwardly through base 232 into a hollow beater head 254 which is similar in construction to beater head 54. Beater head 254 is provided with an annular lug 256 admitting the lower ends of shaft 242 and sleeve 235; and lug 256 is suitably bored to provide an internal shoulder against which the roller bearings 260 on sleeve 235 are held by a collar 262 fastened to the sleeve. On the lower end of shaft 242, which revolves in ball bearings 264 fitted into lug 256, is provided a pinion 266. An internal ring gear 268 meshing with pinion 266 is keyed on a beater spindle 269, whereby the spindle is revolved on its own axis. Gear 268 is supported in a cover 270 fastened to head 254 by a pin 271 and a screw 272. The spindle 269 projects downwardly through cover 270 and has mounted thereon a beater drive clutch 274. Clutch 274 includes a sleeve 275 keyed on spindle 269 and revolving in ball bearings 276 supported in cover 270. A collar 277 pinned on spindle 269 retains the sleeve 275. Since the construction of the beater clutch 274 is similar to that of the beater clutch 74 described above, further description thereof is deemed unnecessary.

The beater head 254 has a tubular extension 290 similar to extension 90 of beater head 54 and projecting upwardly through base 232 and provided at its upper end with an annular flange 292 supporting roller bearings 294 which engage a shoulder 296 of sleeve 235.

On the top of beater head 254 are provided ball bearings 298 on which is supported an internal ring gear 300 which has internal gear teeth and is also provided with gear teeth 301 on its periphery. A pinion 302 on the upper end of beater spindle 269 meshes with the internal teeth of ring gear 300 whereby the beater head 254 will be revolved and the spindle 269 will be moved in an orbital path by the meshing of pinion 302 with the internal gear teeth of ring gear 301 during the rotation of spindle 269 as will be hereinafter described. The upper end of spindle 269 revolves in ball bearings 304 retained against beater head 254 by a sleeve 306 secured on spindle 269 and suitably flared at its lower end to serve as an oil shield.

The external gear teeth 301 of ring gear 300 mesh with a pinion 306 fastened on the lower end of a vertical shaft 308 which revolves in bracket 310 integral with flange 236 of sleeve 235. A shoulder is formed on the upper end of shaft 308 which rests on the top of bracket 310, and the upper end of shaft 308 is of reduced diameter to provide a shoulder 312 on which a bevel gear 314, which is free to revolve on shaft 308, is supported. Gear 314 meshes with a bevel gear 316 on one end of a shaft 318 supported on an arm 320 provided on the head (not shown) from which the housing 230 is supported. On the other end of a shaft 318 is mounted a bevel gear 322 which meshes with and is driven from bevel gear 244.

A jaw clutch 323, which is splined on shaft 308, has a tooth 324 which is adapted to engage notch 325 in the hub of gear 314. Clutch 323 has circumferential flanges between which are mounted rollers 326 supported on the ends of a yoke 328 fastened on a shaft 330 carried by bracket 310. By operating a lever 332 fastened on shaft 330 the clutch 323 may be raised to engage the tooth 324 with notch 325 and thereby drive the shaft 308. Thus, when clutch 323 is engaged with gear 314, the ring gear 300 is driven at a predetermined speed in the same direction in which beater head 254 revolves, due to meshing of pinion 302 with ring gear 300. Therefore the beater spindle 269 will be moved in the orbital path about shaft 242, while revolving on its own axis, with a predetermined precession ratio such as approximately ½ if mixing of foam batches is desired. The position of lever 332 for this operation of the mixer is indicated at C in Fig. 4.

Upon releasing lever 332, the clutch 323 will fall and the tooth 336 on its bottom will engage the notch 338 in bracket 310, and shaft 308 will stop revolving. Therefore the ring gear 300 will remain stationary, and thus the beater spindle 269 will be revolved and moved in its orbital path about the axis of shaft 242 with a greater precession ratio which may be in the neighborhood of 1/3.73 if desired. The position of the lever 332 required to keep ring gear 300 stationary is indicated at A in Fig. 4.

If the lever 332 is operated to maintain the clutch in an intermediate position out of engagement with the notch 325 of bevel gear 314 and the notch 338 of bracket 310, the shaft 308 will be free to revolve, the ring gear 301 will be driven by the pinion 302 and the beater head 254 will not revolve. Hence the beater spindle will remain in one position while revolving on its own axis. The neutral position of lever 332 to permit the ring gear 300 to float or revolve freely is indicated at B in Fig. 4.

What is claimed is:

1. In a mixer, the combination with a support revoluble about a stationary axis, of a spindle adapted to support a beater and revolubly mounted in said support with its axis eccentric to the axis of rotation of said support, means for driving said spindle to revolve it on its own axis, mechanism for driving said support to revolve it on its axis of rotation and thereby move said spindle in an orbital path, a device for varying the speed at which said spindle is driven by said means without varying the speed of rotation of said support, and instrumentalities for varying the speed at which said support is driven by said mechanism without varying the speed of rotation of said spindle.

2. In a mixer, the combination with a support revoluble about a stationary axis, of a spindle adapted to support a beater and revolubly mounted in said support with its axis eccentric to the axis of rotation of said support, means for driving said spindle to revolve it on its own axis, and mechanism, which is separate from and independent of said means, for driving said support to revolve it on its own axis, said mechanism being operable to drive said support at varying speeds and thereby vary the precession ratio of the rotation of the beater upon its own axis relative to the rotation of said support upon its axis.

3. In a mixer, the combination with a support revoluble about a predetermined axis, of a spindle adapted to support a beater and revolubly mounted in said support with its axis eccentric to the axis of rotation of said support, means for driving said spindle to revolve it on its own axis, and mechanism for driving said support, said mechanism being operable to drive said support at various speeds, while said means is driving said spindle at a constant speed, and thereby vary the precession ratio of the rotation of the beater spindle upon its own axis relative to the rotation of said support upon its axis, and a device for varying the speed at which said spindle is driven by said means.

4. In a mixer, the combination with a support revoluble about a vertical axis, of a vertical spindle revolubly mounted in said support with its axis eccentric to the axis of rotation of said support and adapted to support a beater, means for driving said spindle to revolve the same upon its own axis at a predetermined speed, and mechanism for driving said support to revolve the same upon its axis of rotation, said mechanism including a variable speed motor connected to and driving said support whereby adjustment of the speed of said motor to vary the speed at which the support is driven will vary the precession ratio of the rotation of the beater spindle on its own axis relative to the rotation of the support on its axis.

5. In a mixer, the combination with a support revoluble about a vertical axis, of a vertical spindle revolubly mounted in said support with its axis of rotation eccentric to the axis of said support and adapted to support a beater, means for driving said spindle to revolve the same upon its own axis at a predetermined speed, mechanism for driving said support to revolve the same upon its axis, said mechanism being adjustable to vary the speed at which said support is driven and thereby vary the precession ratio of the rotation of the beater spindle upon its own axis relative to the rotation of said support upon its axis, and a device for varying the speed at which the beater spindle is driven.

6. In a mixer, the combination with a stationary member, of a vertical shaft revolubly mounted in said member, the ends of said shaft projecting from said member, a head revolubly mounted on said member, a gear having its hub revolubly mounted in said head with its axis eccentric to said shaft, a beater spindle fastened in the hub of said gear with its axis eccentric to the axis of said shaft, a pinion on the lower end of said shaft meshing with said gear, driving means for driving said head to revolve it on said member and thereby move said spindle in an orbital path, and driving mechanism connected to the upper end of said shaft and operating to drive said shaft and thereby cause said pinion to drive said gear and revolve said beater spindle upon its own axis while being moved in an orbital path by said head, said head driving means including a device for varying the speed at which said head is driven relative to the speed at which said shaft is driven by said driving mechanism and thereby vary the precession ratio of the rotation of said head relative to the rotation of the beater spindle upon its own axis.

7. In a mixer, the combination with a stationary member, of a head revolubly mounted on said member, a ring gear having a hub revolubly mounted in said head with its axis eccentric to the axis of rotation of said head, a beater spindle fastened in the hub of said ring gear with its axis eccentric to the axis of rotation of said head and adapted to support a beater, mechanism for driving said ring gear to cause said beater spindle to revolve upon its own axis, a gear mounted on the exterior of said head, a stationary pinion meshing with and driving the gear mounted on the exterior of said head to cause the head to revolve on said member, and a variable speed motor connected to and operative to drive said stationary pinion at various speeds and thereby vary the precession ratio of the rotation of said head relative to the rotation of the beater spindle upon its own axis.

8. In a mixer, the combination with a stationary member, of a head revolubly mounted on said member, a gear having a hub revolubly mounted in said head with its axis of rotation eccentric to the axis of rotation of said head, a beater spindle fastened in the hub of said gear and adapted to support a beater, mechanism for driving said gear to cause said beater spindle to revolve upon its own axis, and means for driving said head at various speeds and thereby varying the precession ratio of the rotation of said head relative to the rotation of said beater spindle upon its own axis.

9. In a mixer, the combination with a stationary member, of a head revolubly mounted on said member, a ring gear having a hub revolubly mounted in said head with its axis eccentric to the axis of rotation of said head, a beater spindle fastened in the hub of said ring gear with its axis eccentric to the axis of the rotation of said head and adapted to support a beater, mechanism for driving said ring gear to cause said beater spindle to revolve upon its own axis, a gear mounted on the exterior of said head, and a stationary pinion meshing with and driving the gear mounted on the exterior of said head to cause the head to revolve.

10. In a mixer, the combination with a stationary support, of a head mounted for rotation on said support about a vertical axis, a beater spindle revolubly mounted in said head with its axis eccentric to said vertical axis, a device for driving said spindle to cause it to revolve on its own axis, a ring gear revolubly mounted for rotation on the same axis as said head, a pinion secured on said beater spindle and meshing with said ring gear to cause the beater spindle to travel in an orbital path relative to said vertical axis and to rotate said head on said axis, and mechanism for varying the movement of said ring gear to change the speed of rotation of said beater head relative to said spindle.

11. In a mixer, the combination with a stationary support, of a head mounted for rotation on said support about a vertical axis, a beater spindle revolubly mounted in said head with its axis eccentric to said vertical axis, a device for driving said spindle to cause it to revolve on its own axis, a ring gear revolubly mounted for rotation on the same axis as said head, a pinion secured on said beater spindle and meshing with said ring gear to cause the beater spindle to travel in an orbital path relative to said vertical axis and to rotate said head on said axis, and mechanism for varying the movement of said ring gear to change the speed of rotation of said beater head relative to said spindle, said mechanism including means for driving said ring gear.

12. In a mixer, the combination with a stationary support, of a head mounted for rotation on said support about a vertical axis, a beater spindle revolubly mounted in said head with its axis eccentric to said vertical axis, a device for driving said spindle to cause it to revolve on its own axis, a ring gear revolubly mounted for rotation on the same axis as said head, a pinion secured on said beater spindle and meshing with said ring gear to cause the beater spindle to travel in an orbital path relative to said vertical axis and to rotate said head on said axis, mechanism for varying the movement of said ring gear to change the speed of rotation of said beater head relative to said spindle, said mechanism including means for driving said ring gear and a device for disconnecting said means from said ring gear to permit the ring gear to float and thereby stop the orbital movement of the beater head.

13. In a mixer, the combination with a stationary support, of a head mounted for rotation on said support about a vertical axis, a beater spindle revolubly mounted in said head with its axis eccentric to said vertical axis, a device for driving said spindle to cause it to revolve on its own axis, a ring gear revolubly mounted for rotation on the same axis as said head, a pinion secured on said beater spindle and meshing with said ring gear to cause the beater spindle to travel in an orbital path relative to said vertical axis and to rotate said head on said axis, mechanism for varying the movement of said ring gear to change the speed of rotation of said beater head relative to said spindle, said mechanism including means for driving said ring gear, a device for disconnecting said means from said ring gear, and a member adapted to engage said ring gear while it is disconnected from said driving means and thereby stop the rotation of said ring gear.

14. The combination with a support, of a beater head revolubly mounted on said support for rotation upon a vertical axis, a beater spindle revolubly mounted in said head with its axis eccentric to the axis upon which said beater head rotates, means for driving said spindle to cause it to revolve on its own axis, a ring gear revolubly mounted for rotation on the same axis as said beater head rotates, a pinion mounted on said beater spindle and meshing with said ring gear whereby the beater head will remain stationary and the beater spindle will be revolved on its own axis.

15. In a mixer, the combination with a support, of a beater head revolubly mounted on said support for rotation upon a vertical axis, a beater spindle revolubly mounted in said head with its axis eccentric to the axis upon which said beater head rotates, means for driving said spindle to cause it to revolve on its own axis, a ring gear revolubly mounted for rotation on the same axis as said beater head rotates, a pinion mounted on said beater spindle and meshing with said ring gear, and a device for preventing rotation of said ring gear whereby said beater head will be revolved and said spindle will be moved in an orbital path.

16. In a mixer, the combination with a support, of a beater head revolubly mounted on said support for rotation about a vertical axis, a beater spindle revolubly mounted in said head with its axis eccentric to the axis about which said beater head rotates, a ring gear revolubly mounted for rotation upon the same axis as said beater head rotates and provided with a primary set of gear teeth, a pinion mounted on said beater spindle and meshing with the primary gear teeth of said ring gear, said ring gear being also provided with a secondary set of gear teeth, and a gear meshing with said secondary gear teeth and driving said ring gear to cause rotation of said beater head.

17. In a mixer, the combination with a stationary support, of a head mounted on said support for rotation about a vertical axis, a beater spindle revolubly mounted in said head with its axis eccentric to the axis of rotation of said head, a device for driving said spindle to cause it to revolve on its own axis, and mechanism for driving said head to cause it to carry said beater spindle in an orbital path, said mechanism including means for rendering said mechanism inoperative in order to stop the rotation of said head while said device continues to drive and rotate said spindle.

18. In a mixer, the combination with a support, of a beater head revolubly mounted on said support for rotation about a vertical axis, a beater spindle revolubly mounted in said head with its axis eccentric to the axis about which said beater head rotates, means for driving said spindle to revolve it on its own axis, and mechanism for rotating said head about its vertical axis, said mechanism including a ring gear supported on said head, a shaft arranged externally of said head, a pinion mounted on said shaft and meshing with and driving said ring gear to revolve said head on its vertical axis, and a device for driving said shaft.

19. In a mixer, the combination with a stationary support, of a head mounted for rotation on said support about a vertical axis, a beater spindle adapted to support a mixer beater and revolubly mounted in said head with its axis eccentric to the axis of rotation of said head, variable speed means for driving said spindle to cause it to revolve on its own axis at a plurality of predetermined speeds, and mechanism for driving said head to revolve said head and thereby carry said beater spindle in an orbital path, said mechanism including a speed changing device driven from said spindle driving means and having a driving connection to said head to increase or reduce the speed of rotation of said head and thus vary the speed of rotation of said head relative to the speed of rotation of said beater spindle and thereby vary the precession ratio of the rotation of said head and the rotation of said spindle.

20. In a mixer, the combination with a stationary support, of a head mounted for rotation on said support about a vertical axis, a beater spindle adapted to support a mixer beater and revolubly mounted in said head wits its axis eccentric to the axis of rotation of said head, means for driving said spindle to cause it to revolve on its own axis, and variable speed driving mechanism for driving said head at a plurality of predetermined speeds to cause it to revolve and carry said beater spindle in an orbital path, said head driving mechanism including a speed changing device connected with said spindle driving means and adapted to increase or reduce the speed of rotation of said head and thus vary the speed of rotation of said head relative to the speed of rotation of said beater spindle and thereby vary the precession ratio of the rotation of the head and the beater spindle.

21. In a mixer, the combination with a stationary support, of a head mounted on said support for rotation about a vertical axis, a beater spindle revolubly mounted in said head with its axis eccentric to the axis of rotation of said head, a device for driving said spindle to cause it to revolve on its own axis, and mechanism for driving said head to cause it to revolve and carry said beater spindle in an orbital path, said mechanism including means for disconnecting said mechanism from said head to stop the rotation of said head while said device continues to drive and rotate said spindle.

22. In a mixer, the combination with a stationary support, of a head mounted on said support for rotation about a vertical axis, a beater spindle revolubly mounted in said head with its axis eccentric to the axis of rotation of said head, a device for driving said spindle to cause it to revolve on its own axis, and mechanism for driving said head to cause it to revolve and carry said beater spindle in an orbital path, said mechanism including clutch means for disconnecting said head from said mechanism to stop the rotation of said head while said device continues to drive and rotate said spindle.

23. In a mixer, the combination with a stationary support, of a head mounted for rotation on said support about a vertical axis, a beater spindle adapted to support a mixer beater and revolubly mounted in said head with its axis eccentric to the axis of rotation of said support, means for driving said spindle to cause it to revolve on its own axis, and variable speed driving mechanism for driving said head at a plurality of predetermined speeds to cause it to revolve and carry said beater spindle in an orbital path, said head driving mechanism including a speed changing device connected with said spindle driving means and adapted to increase or reduce the speed of rotation of said head and thus vary the speed of rotation of said head relative to the speed of rotation of said beater spindle and thereby vary the precession ratio of the rotation of the head and the beater spindle, and said speed changing device including instrumentalities for stopping the rotation of said head while said means continues to drive and rotates said spindle.

THORMOD JENSEN.